United States Patent
Thode et al.

(10) Patent No.: US 11,067,189 B2
(45) Date of Patent: Jul. 20, 2021

(54) ELECTROMAGNETIC HINGED ARMATURE VALVE DEVICE

(71) Applicant: ETO Magnetic GmbH, Stockach (DE)

(72) Inventors: Oliver Thode, Stockach (DE); Viktor Raff, Constance (DE)

(73) Assignee: ETO Magnetic GmbH, Stockach (DE)

( * ) Notice: Subject to any disclaimer, the term of this patent is extended or adjusted under 35 U.S.C. 154(b) by 28 days.

(21) Appl. No.: 16/474,663

(22) PCT Filed: Oct. 25, 2017

(86) PCT No.: PCT/EP2017/077344
§ 371 (c)(1),
(2) Date: Jun. 28, 2019

(87) PCT Pub. No.: WO2018/121901
PCT Pub. Date: Jul. 5, 2018

(65) Prior Publication Data
US 2020/0124201 A1    Apr. 23, 2020

(30) Foreign Application Priority Data
Dec. 30, 2016   (DE) ..................... 10 2016 125 950.0

(51) Int. Cl.
*F16K 31/06* (2006.01)

(52) U.S. Cl.
CPC ................................ *F16K 31/0682* (2013.01)

(58) Field of Classification Search
CPC .................................................. F16K 31/0682
See application file for complete search history.

(56) References Cited

U.S. PATENT DOCUMENTS

| 5,163,623 A | 11/1992 | Seino |
| 5,762,097 A | 6/1998 | Buerkert |
| 8,272,369 B2 * | 9/2012 | Gaiardo .............. F16K 31/0682 123/470 |

FOREIGN PATENT DOCUMENTS

| CN | 101600877 A | 12/2009 |
| DE | 102014115206 B3 | 2/2016 |

(Continued)

OTHER PUBLICATIONS

International search report for application No. PCT/EP2017/077344 filed Oct. 25, 2017.

*Primary Examiner* — Eric Keasel
(74) *Attorney, Agent, or Firm* — Bachman and Lapointe PC; George Coury

(57) ABSTRACT

The invention relates to an electromagnetic hinged armature valve device with armature means (14) which are configured for interaction with a stationary valve seat (22), are articulated such that they can be pivoted and/or folded in a housing of the valve device relative to stationary core means (16) and coil means (12) which surround them at least in sections, and which armature means (14) are configured to close or open the valve seat as a reaction to an energization of the coil means, wherein a coil carrier assembly (10) which supports a winding of the coil means and encloses the core means and a valve seat assembly (24) which configures the valve seat are configured in such a way that both can be adjusted with respect to one another for assembly of the valve seat device and can then preferably be connected non-releasably to one another, and, in a connected state or assembled state, limit and/or define a pivoting or folding stroke of the armature means which configure at least one flat side, which pivoting or folding stroke can be influenced and/or is influenced by the adjustment.

20 Claims, 1 Drawing Sheet

(56) References Cited

FOREIGN PATENT DOCUMENTS

| EP | 1860314 | A2 | 11/2007 |
|----|---------|----|---------|
| FR | 1531234 | A  | 6/1968  |
| WO | 2006122975 | A1 | 11/2006 |
| WO | 2008068578 | A2 | 6/2008  |

* cited by examiner

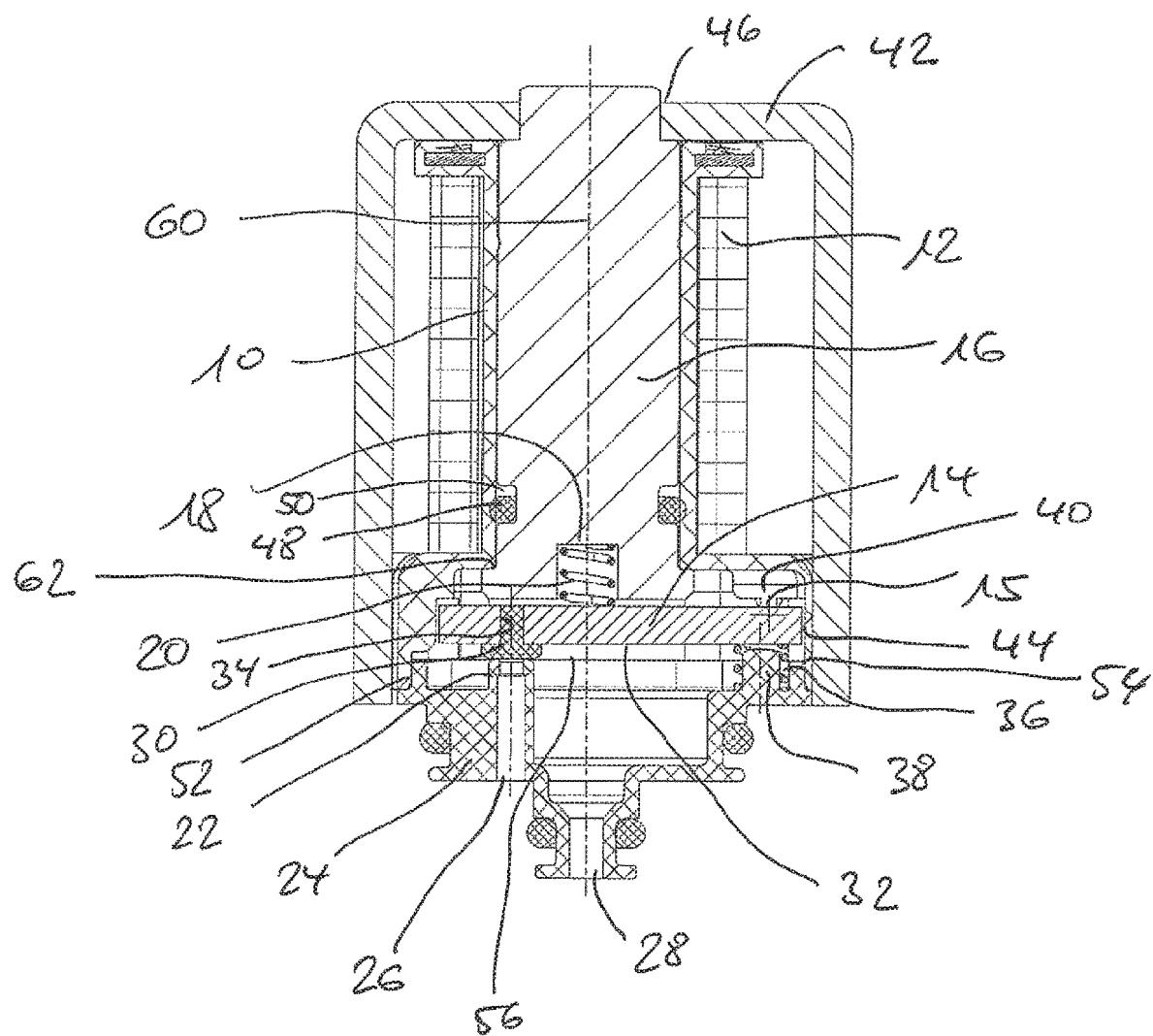

ELECTROMAGNETIC HINGED ARMATURE VALVE DEVICE

BACKGROUND OF THE INVENTION

The present invention relates to an electromagnetic hinged armature valve device according to the preamble of the main claim. Devices of this kind are generally known from the state of the art, and as an electromagnetically movable assembly, they have armature means which are movable relative to a stationary assembly comprising a core (core means) and an energized coil (coil means) interacting with the core, wherein this motion is a pivoting or folding motion and is generally enabled by laterally hinging or supporting the typically flat armature means.

This pivoting or folding motion exposes or seals a valve seat, the functionality of the valve thus being realized by the valve seat being closable in a controlled manner.

Such electromagnetically operable hinged armature valve devices are generally characterized by fast switching times because generally only small masses have to be moved with little pivoting or folding stroke and with the flat armature hinged at one end.

However, in generic hinged armature valve devices, which are assumed to be commonly known, the adjustment or (fine-) tuning of the armature stroke (i.e. of the pivoting or folding stroke) is not unproblematic and is often solved by additional mechanical means or assemblies such as setting or adjustment screws which, in each particular case, have to be set or adjusted for the respective stroke during the mounting of a respective valve. This technology, which is complex—in particular in terms of large series production—and therefore in need of improvement, additionally generates the problem of increased seal complexity regarding sealing of the armature space (potentially changed by the adjustment) because a generic pivoting or folding stroke, which is to be set by additional mechanical means, influences the pressure conditions in the armature space (i.e. a space in the (valve) housing loaded with a pressurized fluid which can be switched by means of the valve device), which has to be sealed with regard to the environment to ensure the proper functionality of the valve.

The consequence of those problems has been that a cost-efficient large-series or mass production of electromagnetically operable hinged armature valve devices (with corresponding tolerances or variances) was possible to a limited extent only and, therefore, this valve technology has yet been unable to reach its full potential for cost reasons.

SUMMARY OF THE INVENTION

Therefore, the object of the present invention is to improve an electromagnetic hinged armature valve device in terms of its production and operating characteristics and, in the process, allow simpler and thus more cost-efficient manufacturability under large-series conditions which optimizes, in particular, tolerance compensation and adjustability of the pivoting or folding stroke for the armature means.

Said object is attained by the electromagnetic hinged armature valve device having the features. Advantageous embodiments of the invention are described herein and in the dependent claims. Additional protection within the scope of the invention is sought for the use of such an electromagnetic hinged armature valve device for realizing a control valve, in particular for applications of a fluid control in the field of automotive technology.

In an advantageous manner according to the invention, the present invention uses the coil carrier assembly and the valve seat assembly in such a manner that in order to produce a hinged armature valve device according to the invention, not only can they be connected to each other (said connection being inseparable and/or pressure-tight with regard to the fluid that has to be switched according to an embodiment of the invention), but both assemblies are also adjustable against one another before being connected, and thus the pivoting or folding stroke of the armature means defined or influenced by these assemblies can be influenced in a manner that is simple and elegant in terms of production.

In an advantageous manner, the basic advantage of hinged armature valves, namely fast switching times in conjunction with high precision in continuous operation, can be achieved through such a (fine-)tuning or adjustment of the working air gap between the core means and the armature means. Therefore, a use of the valve device according to the invention is preferred in particular in connection with a control valve; however, this does not limit the scope of the technology according to the invention.

According to the invention, it is unnecessary, in particular, to employ additional (mechanical) assemblies or units for adjusting or setting the stroke; in connection with the invention, this occurs instead through the adjustment or adjustability of the coil assembly and of the valve seat assembly according to the invention, which, to this end, are further preferably movable against one another in a direction of motion of the armature and/or a longitudinal direction through the valve device as determined by the axial extension of the stationary core means, for example. For that purpose, the units further preferably have suitable sections which are configured for such a movable interaction, such as sleeve sections which are configured for meshing or sliding interaction.

If at least one of the assemblies, more preferably both assemblies, is/are realized from a weldable polymeric material as further preferred and provided in connection with advantageous embodiments of the invention, the present invention allows the inseparable and also preferably pressure-tight connection of both assemblies after suitable adjustment and thus after (fine-)tuning of the provided pivoting or folding stroke by simple welding or selective fusing of the polymeric material. In this way, not only is cost-efficient manufacturability of the device ensured by way of correspondingly inexpensive materials, but the materials can also be simply and elegantly connected in a permanent and pressure-tight manner with the desired precision and by using an otherwise known laser welding procedure.

Additionally, in a preferred and advantageous manner, the assemblies of the coil carrier assembly and of the valve seat assembly, which interact and are adjustable against one another before being (permanently) connected, allow a suitable pivoting or folding bearing for the armature means to be realized, wherein, particularly preferably, the hinged armature, which is advantageously flat or (at least partially) planar, can be pivotably guided at one end in a bearing section which is formed by these two assemblies. In an embodiment, at least one of these assemblies can form a corresponding bearing projection which is constructively simple and low-wear (and which is provided with a curved engagement surface, for example). Spring means would then be able to realize a pivoting or folding bearing in a constructively simple and reliable manner by interacting with the other assembly, for example.

Additionally, it is constructively preferred for a magnetic flux-conducting housing section of the (valve) housing according to the invention to be configured such that it at least partially surrounds the coil carrier assembly, wherein the housing section conducting magnetic flux can be realized, in particular, in the manner of a frame or c-frame. In this embodiment of the described configuration examples, in particular, it is then advantageous to dispose a (free) end of such a magnetic flux-conducting housing section relative to the armature means, in particular adjacent to their pivoting or folding bearing, in such a manner that a magnetic flux generated in response to an energization of the stationary coil means can be introduced into the hinged armature (armature means) through a (working) air gap formed in this bearing section; the rest of the magnetic flux circuit could be closed through the core means (which form a stop for the armature means) and a connection (rearward with regard to the armature means) between the core means and the housing section conducting magnetic flux. Such a magnetic configuration allows in turn a mass series production or mounting of the hinged armature valve device according to the invention by minimizing the components or assemblies and the dimensional tolerances. Said production will also involve, in particular, the use of production procedures deforming the material, such as a preferred pressing or press-fitting between the housing section conducting magnetic flux and the core means as preferably to be provided at the (axial) end portion of the core means opposing the armature means.

Within the scope of the present invention, the valve seat assembly (preferably realized from a polymeric or other injectable material) realizes the valve seat directly and also preferably in one piece, the valve seat being configured for sealing or opening interaction with the armature means. In order to ensure a reliable sealing effect, according to an embodiment, a sealing section, which is realized from polymeric or elastomer material and which can also preferably be disposed at or on the (at least one) flat side of the armature means so as to also preferably extend through an opening in the armature means, can be assigned to the armature means. This does not only allow a simple and preferably automatable production; additionally, reliable geometrical matching to the outlet or nozzle portion of the valve seat is possible, as well, without the magnetic properties or flux-conducting properties of the armature means being significantly affected.

In a preferred embodiment of the invention, the valve seat assembly (which is realized from a polymeric or injectable material) is realized to additionally form a second valve inlet and outlet, which, in conjunction with the first valve inlet and outlet realized by the valve seat, determines both the inflow and outflow of the fluid and the flow in the valve. Therefore, the valve seat assembly according to the invention then has an additional key function on top of its role in the interaction with the coil carrier assembly, namely with regard to the ports of the valve relating to the fluid that has to be switched. It is also particularly preferred for this assembly to be realized in one piece so that the assembly, which is critical to success, can be inexpensively and efficiently realized using a single injection process.

Through the invention, in particular through the adjustable and sealing interaction between the coil carrier assembly and the valve seat assembly according to the invention, the associated area of the armature space is already sealed with regard to the fluid which has to be switched. In an embodiment according to the invention, the sealing of the armature section is completed by merely sealing the core means against the coil carrier assembly surrounding the core means, which, in an embodiment, happens in a constructively simple and inexpensive manner in terms of production by providing a ring seal or similar circumferential seals in a circumferential shoulder between the core means and the coil carrier assembly. Advantageously according to the invention, the overall sealing complexity of the hinged armature valve device realized according to the invention is thus minimized, which does not only reduce the complexity of production, but additionally lowers the risk of leakages, leakage losses or similar effects, in particular after a long operating time and service life.

The advantageous configurations of the invention described above, in particular, allow a simple realization of a normally closed valve in such a manner that, according to an embodiment of the invention, the provided closed neutral position is defined by provided spring means, such as a compression spring which preloads the armature means against the valve seat and is supported by the core means for this purpose.

Alternative configurations of the valve seat and/or of spring means to be used, in particular also the provision of a possible (axial) opening in the core means, allow a variation of this valve topology, deviating from the NC 2/2 topology toward a NO 2/2 topology (i.e. a normally open topology with two inflows or outflows and two switching positions), or alternatively a 3/2 topology with three inflows or outflows, said topology variation comprising an additional (ventilation) port.

As a result, the present invention allows inexpensive, compact and easily adjustable production, which is therefore suitable for series production of electromagnetic hinged armature valve devices, the present invention thus paving the way for the valve principle to be usable in various fields of application which have not yet been accessible for reasons of cost.

Other advantages, features and details of the invention are apparent from the following description of preferred embodiments and from the figures.

BRIEF DESCRIPTION OF THE DRAWINGS

FIG. 1 is a longitudinal-section view of the electromagnetic hinged armature valve device according to a first embodiment of the present invention.

DETAILED DESCRIPTION

A coil carrier assembly 10 which is produced from plastic material by injection molding carries, in an otherwise known manner, a winding 12 which can be externally contacted and energized in order to pivot a hinged armature 14, which is planar on both sides, flat and elongated, around a pivoting or folding bearing 15 toward a stationary core 16, which is surrounded by coil carrier 10, according to the principle of a hinged armature valve device.

The action of a compression spring 20 which is accommodated in a recess 18 at the end face of core 16 facing the armature preloads hinged armature 14 against a valve seat 22, which is a nozzle-like integral part of a valve seat assembly 24 produced from plastic material by injection molding and which is externally open toward a valve outlet 26. In the embodiment shown, said valve outlet 26 is disposed eccentric and axially parallel to valve inlet 28, which is also an integral part of valve seat assembly 24 and, in conjunction with outlet 26, forms a 2/2 valve which is actuated by switching positions of hinged armature 14, the action of compression spring 20 and its preloading of armature 14 onto valve seat 22 maintaining an NC-functionality in the closed position shown in FIG. 1 when coil 12 is not energized.

Specifically, as the longitudinal-section view additionally clarifies, a sealing body 30 seals valve seat 22 in the closing position shown (not energized), seal seat 30, which is realized from a polymeric sealing material, being formed at a lower flat side 32 of armature 14 which faces valve seat 22 and extending through an opening 34 in armature 14 in order to improve adhesion, durability and mounting.

On the right side of FIG. 1, armature 14 is pressed against a hinge projection 40, which extends from coil carrier assembly 10, by the action of a compression spring 36, which surrounds a projection 38 of the valve seat assembly and is supported by the assembly, in order to realize bearing 15. In this way, mounting which has play while being low-wear, precise and mechanically simple is made possible between sections 38 and 40, including intermediate spring 36, said mounting additionally enabling, between the armature and a magnetically conductive c-frame 42 which surrounds the assembly of FIG. 1 like a housing, a minimized parasitic air gap 44 toward a free end of c-frame 42.

C-frame 42, in turn, is connected to core section 16 both mechanically and in a manner conducting magnetic flux through press-fitting or rolling at end face 46 opposing armature 14.

The longitudinal-section view of FIG. 1 additionally clarifies how an O-ring seal 48, which engages into a lateral circumferential groove 50 of core unit 16, seals core means 16 with respect to coil carrier assembly 10 (more precisely: with respect to its hollow-cylindrical inner wall).

Since coil carrier assembly 10 is connected to valve seat assembly 24 inseparably and likewise in a pressure-tight manner (by laser welding, whose application is particularly favorable in this case), in particular at transitional portions 52 and 54 which, in sections, run parallel in the manner of sleeves, a pressure-tight inner valve space or armature space 56 is defined by these two assemblies (including core unit 16), in which fluid entering through inlet 28 is either (pressure-tightly) retained, corresponding to the valve switching position of FIG. 1, or can exit through outlet 26 following valve seat 22 if hinged armature 14 attracts (against the restoring force of compression spring 20) when coil means 12 are energized, hits the associated end face of core unit 16 and thus exposes valve seat 22 by removing sealing body 30 from valve seat 22 so that it can conduct fluid.

As becomes clear, the small pivoting or folding stroke of armature 14, which is typical of hinged armature valves, is defined, on the one hand, by an axial relative position (with regard to a longitudinal axis or symmetry axis 60) between core means 16 and coil carrier assembly 10—here, a circumferential shoulder 62 at core means 16 defines this axial position—and, on the other hand, by an axial relative position between coil carrier assembly 10 and valve seat assembly 24: at positions 52 and 54, they engage one another in an axially movable manner (thus being adjustable prior to being welded) in the form of coaxial sleeve-like surfaces and thus enable setting of the (maximum) armature pivoting or folding stroke, in particular in a simple manner potentially suitable for mass production. More precisely, the armature pivoting or folding stroke is set during mounting by fine-tuning the (axial) distance between assemblies 10 and 24 after core unit 16 and armature unit 14 have been introduced and assemblies 10 and 24 have been joined, whereafter, in the adjusted relative position, the two assemblies 10, 24 are inseparably and pressure-tightly connected by welding, in particular at sections 52, 54 and thus in the area of the free legs or open ends of c-frame 42 (without requiring a mechanical connection to frame 42).

In this way, the working air gap (formed between armature 14 and core 16) can be adjusted not only with high precision, but also in an automated manner and thus a manner potentially suitable for large series production, this embodiment example of the invention—and various alterations and modifications of the valve type shown in FIG. 1 merely as an example are possible—combining faster switching times with high accuracy in continuous operation and with minimal variance (thus high quality) in production.

REFERENCE SIGNS

10 coil carrier assembly
12 winding
14 hinged armature
15 pivoting or folding hinge/bearing
16 core
18 recess
20 compression spring
22 valve seat
24 valve seat assembly
26 valve outlet
28 valve inlet
30 sealing body
32 flat side
34 opening
36 compression spring
38 projection
40 hinge projection
42 c-frame
44 air gap
46 end
48 seal
50 circumferential groove
52 transitional portion
54 transitional portion
56 inner valve space or armature space
60 longitudinal axis or symmetry axis
62 circumferential shoulder

The invention claimed is:

1. An electromagnetic hinged armature valve device, comprising armature means (14) configured for interaction with a stationary valve seat (22) and hinged such that the armature means (14) can be pivoted relative to stationary core means (16) and to coil means (12) at least partially surrounding the stationary core means (16) in a housing of the valve device, the armature means (14) being configured to close or open the valve seat in response to an energization of the coil means, wherein a coil carrier assembly (10) carrying a winding of the coil means and surrounding the core means and a valve seat assembly (24) forming the valve seat are configured such that both are adjustable against one another for a mounting of the valve seat assembly and, in a connected or assembled state, limit and/or define a pivoting stroke of the armature means, which can be influenced and/or is influenced by the adjustment, the armature means forming at least one flat side, and wherein the coil carrier assembly (10) and the valve seat assembly (24) are welded together in the assembled state at a spacing of the coil carrier assembly (10) relative to the valve seat assembly (24) selected to define the pivoting stroke.

2. The valve device according to claim 1, wherein the coil carrier assembly and/or the valve seat assembly is made of polymeric material.

3. The valve device according to claim 1, wherein the coil carrier assembly and/or the valve seat assembly form a pivoting bearing (15) for the armature means.

4. The valve device according to claim 3, wherein the armature means are movable supported between the coil carrier assembly and the valve seat assembly at one end to realize the pivoting bearing.

5. The valve device according to claim 1, wherein a magnetic flux-conducting housing section (42) of the housing is formed adjacent to the pivoting bearing in such a manner that a magnetic flux generated by the energized coil means can be introduced into a bearing-side end portion of the armature means.

6. The valve device according to claim 5, wherein the magnetic flux-conducting housing section (42) of the housing is a c-frame, and wherein the magnetic flux generated by the energized coil means can be introduced into the bearing-side end portion of the armature means at an end face.

7. The valve device according to claim 5, wherein the housing section (42) conducting magnetic flux is connected to the core means in a magnetic flux-conducting manner at a front or end face (46) opposing the armature means (16) in an axial direction (60) or extension direction of the core means (16).

8. The valve device according to claim 7, wherein the housing section (42) is connected to the core means by a material-deformation procedure.

9. The valve device according to claim 1, wherein the armature means have a polymeric sealing section (30) and/or a sealing section made of elastomer material for interacting with the valve seat realized by the valve seat assembly.

10. The valve device according to claim 9, wherein the sealing section is formed on and/or at the at least one flat side of the armature means and/or extends with its polymeric or elastomer material through an opening (34) in the armature means.

11. The valve device according to claim 1, wherein the valve seat assembly forms a valve seat which is designed as a nozzle and is assigned to a first valve inlet or outlet (26) and forms a second valve inlet or outlet (28).

12. The valve device according to claim 11, wherein the second valve inlet or outlet (28) is disposed adjacent to the first valve inlet or outlet (26).

13. The valve device according to claim 12, wherein the first valve inlet or outlet (26) and the second valve inlet or outlet (28) are in one piece.

14. The valve device according to claim 1, wherein the core means forms a stop for the at least one flat side of the armature means is held in the coil carrier assembly (10) by means of sealing means.

15. The valve device according to claim 14, wherein the sealing means is a circumferential ring seal (48).

16. The valve device according to claim 1, wherein the armature means are preloaded relative to the valve seat by means of spring means (20).

17. The valve device according to claim 1, wherein the coil carrier assembly (10) and the valve seat assembly (24) can be inseparably connected to each other.

18. The valve device according to claim 17, wherein the coil carrier assembly and/or the valve seat assembly is made of polymeric material, and the inseparable connection is established by pressure-tight deforming and/or welding of the polymeric material.

19. The valve device according to claim 16, wherein the spring means is a compression spring engaging at or into the core means.

20. The valve device according to claim 1, wherein the valve seat assembly (24) and the coil carrier assembly (10) are adjustable against one another to define the pivoting stroke of the armature means by way of sliding sleeve interaction between the coil carrier assembly (10) and the valve seat assembly (24), and wherein, in the assembled state, components of sleeve sections of the valve seat assembly (24) and the coil carrier assembly (10) are welded together.

* * * * *